(12) United States Patent
Yoshida

(10) Patent No.: US 11,980,952 B2
(45) Date of Patent: May 14, 2024

(54) CUTTING INSERT

(71) Applicant: TUNGALOY CORPORATION, Fukushima (JP)

(72) Inventor: Satoru Yoshida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 465 days.

(21) Appl. No.: 17/422,224

(22) PCT Filed: Aug. 27, 2020

(86) PCT No.: PCT/JP2020/032394
§ 371 (c)(1),
(2) Date: Jul. 12, 2021

(87) PCT Pub. No.: WO2021/039913
PCT Pub. Date: Mar. 4, 2021

(65) Prior Publication Data
US 2022/0080517 A1   Mar. 17, 2022

(30) Foreign Application Priority Data
Aug. 28, 2019   (JP) ................................. 2019-155770

(51) Int. Cl.
*B23C 5/20* (2006.01)
*B23C 5/10* (2006.01)

(52) U.S. Cl.
CPC .............. *B23C 5/20* (2013.01); *B23C 5/109* (2013.01); *B23C 5/202* (2013.01); *B23C 2200/0494* (2013.01)

(58) Field of Classification Search
CPC ........... B23C 5/202; B23C 5/109; B23C 5/20; B23C 2200/0494; B23C 2200/203;
(Continued)

(56) References Cited

U.S. PATENT DOCUMENTS 7,040,844 B1 * 5/2006 Daiguji ................. B23C 5/2213
407/113
7,261,497 B2 * 8/2007 Maeda ................... B23C 5/109
407/42

(Continued)

FOREIGN PATENT DOCUMENTS

DE      10336616 A1   5/2004
EP       1077100 A2   2/2001
(Continued)

OTHER PUBLICATIONS

International Search Report issued in PCT/JP2020/032394; mailed Nov. 10, 2020.
(Continued)

*Primary Examiner* — Sara Addisu
(74) *Attorney, Agent, or Firm* — Studebaker & Brackett PC

(57) ABSTRACT

The present disclosure provides a cutting insert that is economical and can be stably fixed to a tool body. A first edge line (10R) of a cutting insert (2) is a rectangle having a first side (11) and a third side (13) as long sides and a second side (12) and a fourth side (14) as short sides. Cutting edges are formed at the first side (11), the second side (12) and the third side (13); on the other hand no cutting edge is formed at the fourth side (14). At a second edge line (20R) having the same shape as the first edge line (10R), a sixth side (22) where a cutting edge is formed is opposite to the fourth side (14), and an eighth side (24) where a cutting edge is not formed is opposite to the second side (12). A peripheral side surface (30) includes a fourth side surface (34) facing the fourth side (14) and the sixth side (22). The fourth side surface (34) extends from a first end surface (10) to a second end surface (20) and is inclined in a direction from the second side (12) to the fourth side (14).

5 Claims, 11 Drawing Sheets

(58) Field of Classification Search
CPC ........ B23C 2200/208; B23C 2200/361; B23C 2210/0428; B23C 2210/045; B23C 2220/52; B23C 2270/14
See application file for complete search history.

(56) References Cited

U.S. PATENT DOCUMENTS

| | | | | |
|---|---|---|---|---|
| 8,827,605 | B2* | 9/2014 | Mergenthaler | B23B 27/143 |
| | | | | 408/231 |
| 10,086,447 | B2* | 10/2018 | Nam | B23C 5/20 |
| 10,189,097 | B2* | 1/2019 | Touma | B23C 5/202 |
| 10,583,502 | B2* | 3/2020 | Shiroma | B23C 5/109 |
| 11,135,659 | B2* | 10/2021 | Mao | B23B 51/00 |
| 2005/0147475 | A1* | 7/2005 | Nagaya | B23C 5/109 |
| | | | | 407/42 |
| 2013/0101363 | A1* | 4/2013 | Yoshioka | B23C 5/205 |
| | | | | 407/42 |
| 2013/0108388 | A1 | 5/2013 | Ishi | |
| 2013/0115022 | A1* | 5/2013 | Ishi | B23C 5/202 |
| | | | | 407/100 |
| 2013/0136547 | A1* | 5/2013 | Kurokawa | B23C 5/109 |
| | | | | 407/42 |
| 2017/0008100 | A1 | 1/2017 | Oikawa | |
| 2017/0036278 | A1 | 2/2017 | Ishi | |
| 2017/0157685 | A1* | 6/2017 | Mao | B23C 5/10 |
| 2017/0326658 | A1* | 11/2017 | Oikawa | B23C 5/2226 |
| 2018/0339350 | A1* | 11/2018 | Mura | B23C 5/202 |
| 2020/0306844 | A1* | 10/2020 | Atar | B23C 5/202 |
| 2022/0072633 | A1* | 3/2022 | Aso | B23C 5/2213 |

FOREIGN PATENT DOCUMENTS

| | | | | |
|---|---|---|---|---|
| EP | 2394766 | A1 | 12/2011 | |
| EP | 3050655 | A1 * | 8/2016 | ............... B23C 5/10 |
| FR | 2858946 | A1 | 2/2005 | |
| JP | 54099287 | A * | 8/1979 | |
| JP | 2001-198724 | A | 7/2001 | |
| JP | 2016172294 | A * | 9/2016 | ............... B23C 5/20 |
| WO | 2012/046556 | A1 | 4/2012 | |
| WO | 2012/114848 | A1 | 8/2012 | |
| WO | 2015/129769 | A1 | 9/2015 | |
| WO | WO-2016085150 | A1 * | 6/2016 | ............. B23B 27/02 |
| WO | WO-2019022016 | A1 * | 1/2019 | ............... B23C 5/10 |

OTHER PUBLICATIONS

Written Opinion issued in PCT/JP2020/032394; mailed Nov. 10, 2020.

* cited by examiner

CUTTING INSERT

TECHNICAL FIELD

The present disclosure relates to a cutting insert.

BACKGROUND

An end mill is provided with a main cutting edge that cuts in the radial direction and an inner edge that cuts in the axial direction. If the inner edge extends from the outer peripheral surface of the tool body to the center of rotation, then it is possible to perform a drilling process that cuts directly below.

An end mill capable of drilling is provided with, for example, a pair of cutting inserts. One of the cutting inserts is referred to as a center edge, which has an inner edge extending from the outer peripheral surface of the tool body to the center of rotation and a main cutting edge locating on the outer peripheral surface of the tool body. The other cutting insert is referred to as an outer peripheral edge, which has a main cutting edge on a side that is opposite to the main cutting edge of the center edge by 180°. Such an end mill needs two cutting inserts with different shapes, which results in inconvenience in tool management.

In order to facilitate tool management, a cutting insert is proposed, where a cutting insert with one shape may be used as either the center edge or the outer peripheral edge (for example, please refer to Patent Document 1). According to Patent Document 1, a cutting insert used as the center edge may be reused as the outer peripheral edge.

Patent Document

Patent Document 1: International Publication No. 2012/114848

SUMMARY

In Patent Document 1, since the front and back surfaces of the cutting insert have asymmetric, complex shapes, the front and the back surfaces cannot be interchanged for further use. In view of this, an objective of the present disclosure is to provide a cutting insert that is economical and can be stably fixed to a tool body.

In a technical solution of the present disclosure, a cutting insert has a first end surface, a second end surface opposite to the first end surface, and a peripheral side surface connecting the first end surface and the second end surface, wherein a first edge line at which the first end surface intersects the peripheral side surface is a rectangle having a first side and a third side as long sides and a second side and a fourth side as short sides; a cutting edge is respectively formed at the first side, the second side and the third side respectively; no cutting edge is formed at the fourth side; a second edge line at which the second end surface intersects the peripheral side surface is a rectangle having an identical shape to the first edge line; a sixth side where a cutting edge is formed is opposite to the fourth side, and an eighth side where a cutting edge is not formed is opposite to the second side; the peripheral side surface includes a fourth side surface facing the fourth side and the sixth side; the fourth side surface extends from the first end surface to the second end surface and is inclined in a direction from the second side to the fourth side.

According to the technical solution, the first side longer than the second side may be formed into an inner edge, the second side may be formed into a main cutting edge of a center edge, and the third side may be formed into the main cutting edge of an outer peripheral edge. Both the center edge and the outer peripheral edge may be composed of cutting inserts of the same shape, avoiding the need to provide two types of cutting inserts for the center edge and the outer peripheral edge. Since the cutting edge of the center edge and the cutting edge of the outer peripheral edge are formed at the first edge line and the second edge line respectively, the center edge and the outer peripheral edge can be interchanged and the cutting insert can be reused. The first edge line and the second edge line have the same shape, so the cutting insert can be reused by interchanging front and back surfaces. In other words, the same cutting insert can be used four times. In the cutting insert, the fourth side surface and the second end surface may define an acute angle, and one end of the cutting insert may form a wedge shape. When the cutting insert is fixed as the center edge or as the outer peripheral edge, the fourth side surface that does not form a cutting edge on a side of the first end surface can bite into a corner of an insert pocket of the tool body to be fixed. In this way, the present disclosure provides a cutting insert that is economical and can be stably fixed to the tool body.

In the technical solution above, a pair of two cutting inserts may be attached to the tool body to form an end mill capable of drilling. The two cutting inserts may have an identical shape and may be interchangeable. One of the cutting inserts may be a center edge in which the first side may extend from the outer peripheral surface of the tool body to a rotation axis of the tool body in a state where the fourth side is attached in a direction along the rotation axis. The other of the cutting inserts may be an outer peripheral edge in which the second side may be located on the outer peripheral surface opposite to the center edge in a state where the third side may be attached in a direction along the rotation axis.

According to the technical solution, since the first side extends to the rotation axis of the tool body, it is possible to perform a drilling process stably. It should be noted that even when the first side is just a little short of reaching the rotation axis, it is still possible to perform a drilling process while crushing a cutting residue with the tool body. However, such processing may put a heavy burden on the end mill.

In the above technical solution, in addition to the main cutting edge of the center edge, a wiper cutting edge for smoothing a finished surface of a material cut by the main cutting edge of the outer peripheral edge may also be provided at the second side. Preferably, the wiper cutting edge of the outer peripheral edge may be inclined with respect to the main cutting edge of the center edge.

In this implementation, even if the main cutting edge of the center edge and the wiper cutting edge of the outer peripheral edge are adjacent to each other, there may be an angular deviation between them. When the main cutting edge is used, the wiper cutting edge may be retracted from the main cutting edge in the advancing direction of the tool body. When the wiper cutting edge is used, the main cutting edge may be retracted from the finished surface smoothed by the wiper cutting edge. If the main cutting edge of the center edge and the wiper cutting edge are on the same plane, when one of the cutting edges is used, the other cutting edge may be damaged at the same time. For example, when a cutting insert used as a center edge is reused as an outer peripheral edge, a wiper cutting edge that has already been damaged before replacement will have to be used. Fortunately, such damage can be suppressed according to the technical solution.

In the above technical solution, a mounting hole may be provided through which a fastening screw screwed into the tool body passes. The mounting hole may penetrate the first end surface and the second end surface, and a center axis of the mounting hole may be inclined with respect to the first end surface and the second end surface.

According to the technical solution, during tightening, since one end of the wedge-shaped cutting insert may be pressed into the corner of the insert pocket of the tool body, the cutting insert may be more stably fixed to the tool body.

In the above technical solution, the peripheral side surface may include a first side surface facing the first side. When viewed from the first side surface, the main cutting edge of the outer peripheral edge bulges in a direction from the second end surface to the first end surface.

According to the technical solution, since the rotation trajectory of the main cutting edge is close to an ideal imaginary cylindrical surface, a smooth finished surface can be formed.

In view of this, the present disclosure can provide a cutting insert that is economical and can be stably fixed to the tool body.

DETAILED DESCRIPTION

Figure 1:
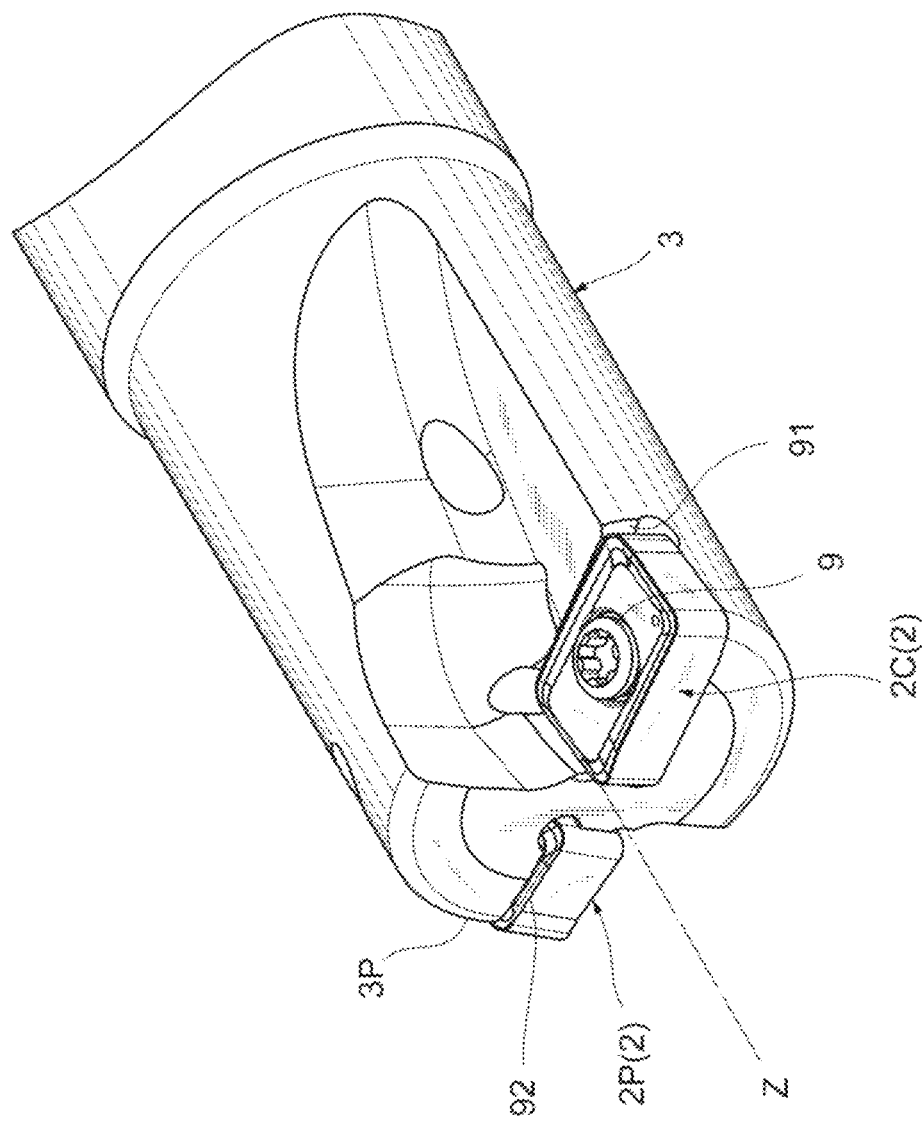
FIG. 1 is a perspective view illustrating an example of an end mill provided with a cutting insert according to an implementation of the present disclosure.

The preferred implementations of the present disclosure are described below with reference to the accompanying drawings. It should be noted that in each figure, components marked with the same symbols have the same structure. In an implementation of the present disclosure, cutting inserts 2 are attached to a tool body 3 in a set of two to form an end mill 1 capable of drilling.

The set of two cutting inserts 2 have the same shape and are interchangeable. In addition, in the cutting insert 2, a first end surface 10 and a second end surface 20 opposite to the first end surface are formed in the same shape and are interchangeable. Therefore, a cutting insert used as a center edge 2C may be reused as an outer peripheral edge 2P. In addition, the cutting insert 2 may be reused by interchanging the first end surface 10 (front surface) and the second end surface 20 (back surface). That is, a cutting insert 2 may be used four times in total.

In the cutting insert 2, a first edge line 10R of the first end surface 10 is formed in a roughly rectangular shape, and a second edge line 20R of the second end surface 20 is formed in the same roughly rectangular shape. At the first edge line 10R, cutting edges are formed at a first side 11, a second side 12 and a third side 13. On the other hand, no cutting edge is formed at a fourth side 14 that is a short side. The second edge line 20R has the same structure. Short sides (the fourth and eighth sides 14 and 24), at which no cutting edges are formed, have a dovetail shape; they bite into insert pockets 91 and 92 of the tool body 3 in a wedge shape and are firmly restrained. The structures are described in detail below with reference to FIGS. 1 to 11.

FIG. 1 is a perspective view illustrating an example of the end mill 1 provided with the cutting insert 2 according to an implementation of the present disclosure. As shown in FIG. 1, the tool body 3 driven to rotate and the replaceable cutting insert 2 are combined to form the end mill 1 with a replaceable cutter head. The insert pockets 91 and 92 are provided at a front end of the tool body 3. A feature of the cutting insert 2 of the present disclosure is that it may be fixed to either the insert pocket 91 for the center edge or the insert pocket 92 for the outer peripheral edge. As shown in FIG. 1, the center edge 2C extends from an outer peripheral surface 3P of the tool body 3 to a rotation axis Z thereof. The outer peripheral edge 2P is located on an outer peripheral surface 3P on a side that is opposite to the center edge 2C by 180°.

Figure 2:
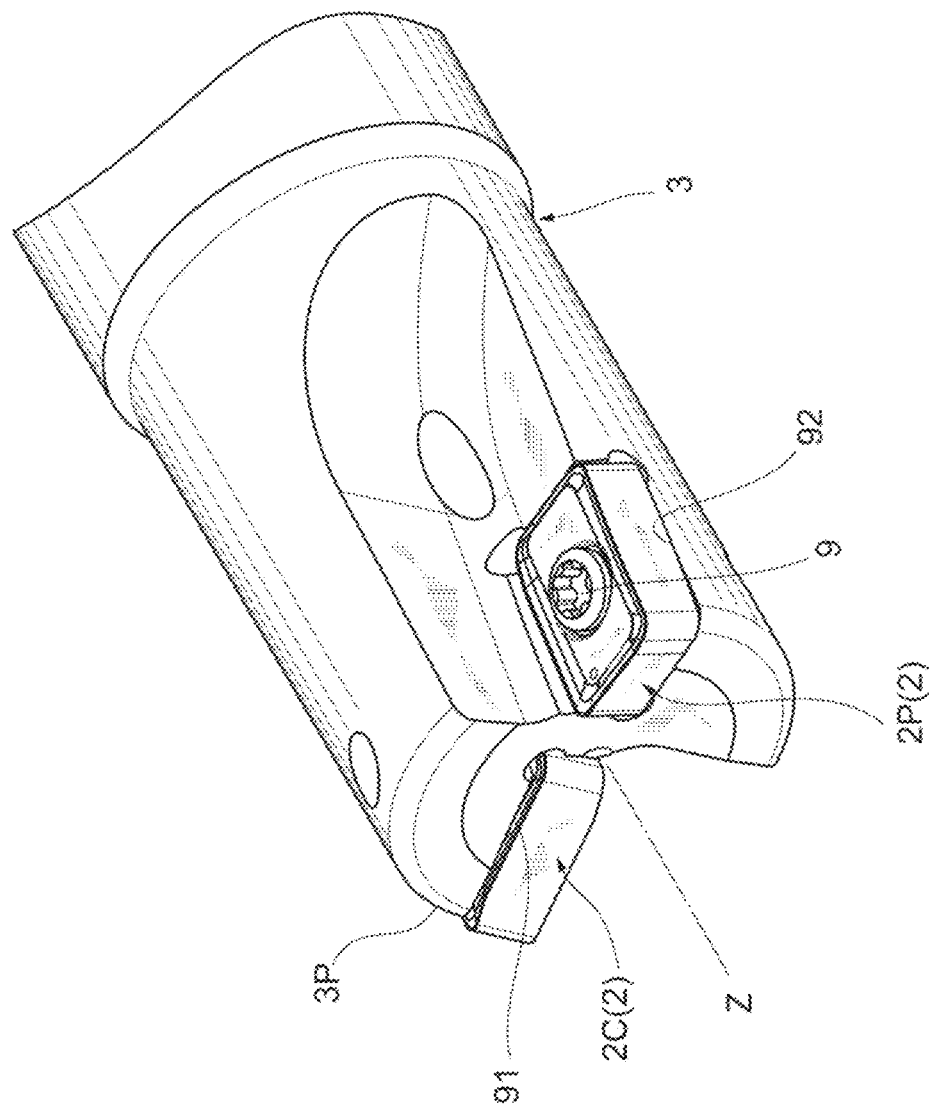
FIG. 2 is a perspective view of the end mill shown in FIG. 1 viewed from an outer peripheral edge.

FIG. 2 is a perspective view of the end mill 1 shown in FIG. 1 viewed from the outer peripheral edge 2P. In the example shown in the figure, one insert pocket 92 for the outer peripheral edge is provided. There may also be two or more insert pockets 92 for the outer peripheral edge. In the example shown in the figure, a clamping means for fixing the cutting inserts 2 to the insert pockets 91 and 92 is configured as a screw-on type, in which a fastening screw 9 is inserted into a mounting hole 40 of the cutting insert 2. It should be noted that the tool body 3 is not limited to the screw-on type, and may adopt a lever lock type, among others.

Figure 3:
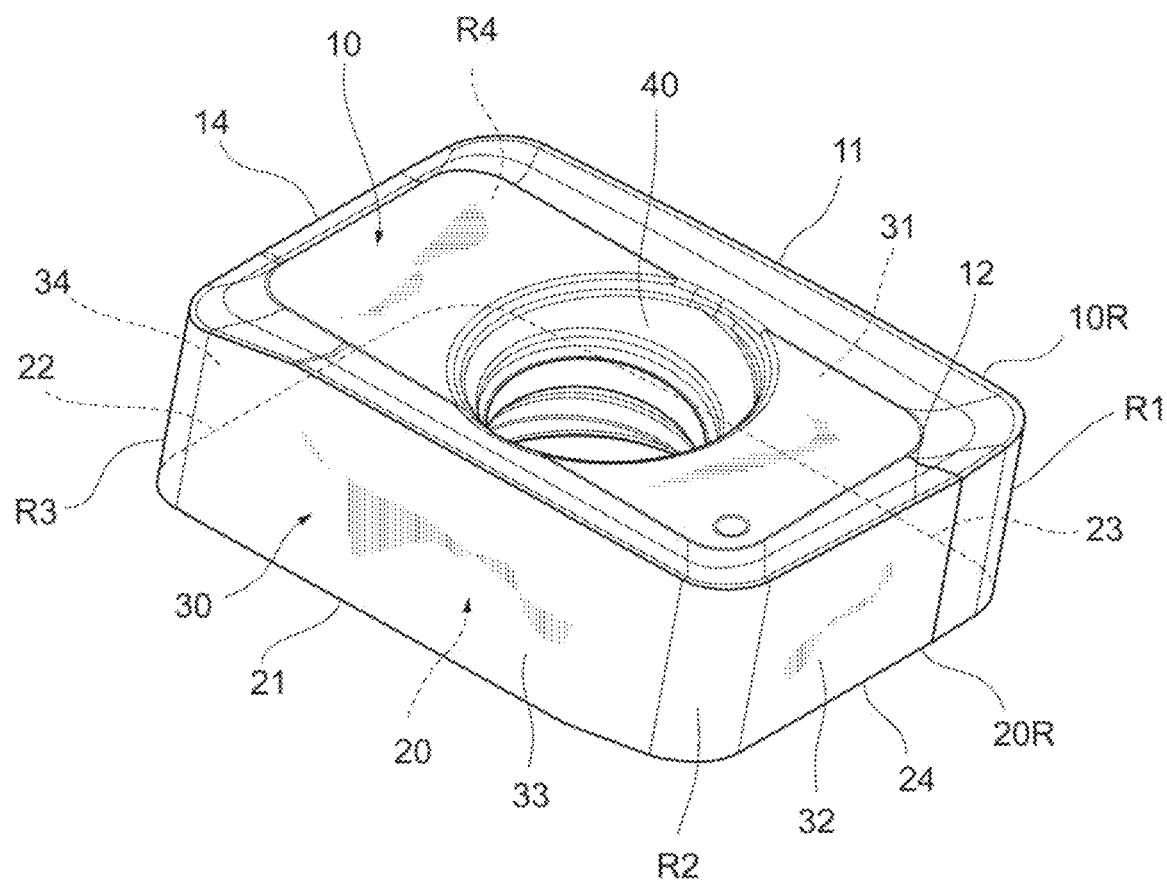
FIG. 3 is a perspective view illustrating an example of the cutting insert according to an implementation of the present disclosure.

FIG. 3 is a perspective view illustrating an example of the cutting insert 2 according to an implementation of the present disclosure. There is no particular material limitation for the cutting insert 2, and various materials including cemented carbide may be used for the cutting insert. As shown in FIG. 3, the cutting insert 2 has a first end surface 10, a second end surface 20 opposite to the first end surface 10 and a peripheral side surface 30 connecting the first end surface 10 and the second end surface 20.

The first end surface 10 and the second end surface 20 have roughly the same shape and function. In the end mill 1, the first end surface 10 may be a rake surface and the second end surface 20 a restraining surface. Alternatively, the second end surface 20 may be a rake surface and the first end surface 10 a restraining surface. Therefore, the first end surface 10 is taken as a representative for detailed description, and the second end surface 20 may not be repeatedly described.

Figure 4:
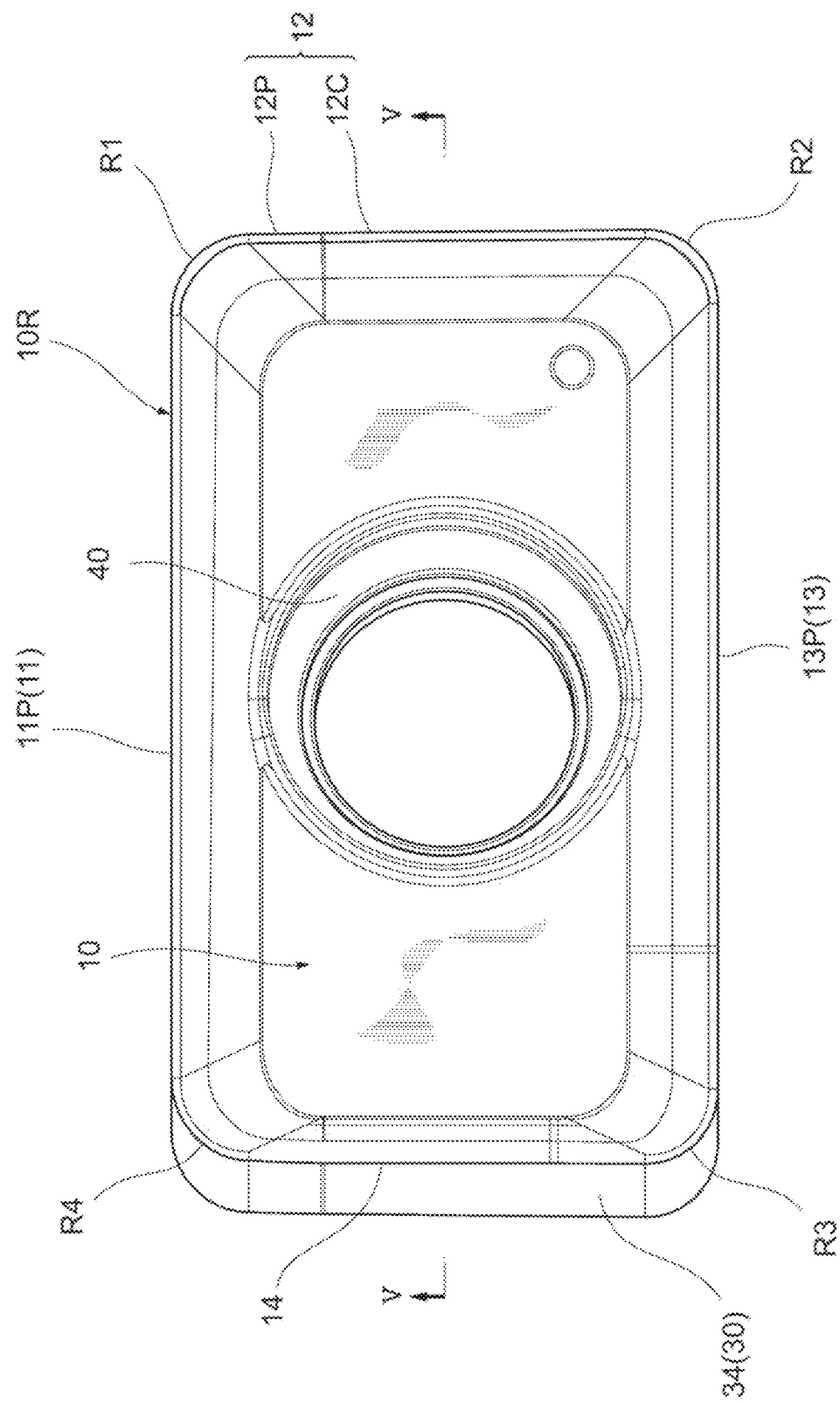
FIG. 4 is a front view illustrating a first end surface of the cutting insert shown in FIG. 3.

A first edge line 10R at which the first end surface 10 intersects the peripheral side surface 30 is a rectangle having a first side 11 and a third side 13 as long sides and a second side 12 and a fourth side 14 as short sides (refer to FIG. 4). A second edge line 20R at which the second end surface 20 intersects the peripheral side surface 30 has the same shape as the first edge line 10R, that is, the second edge line is a rectangle having a fifth side 21 and a seventh side 23 as long sides and a sixth side 22 and an eighth side 24 as short sides. In the peripheral side surface 30, the first side 11 and the seventh side 23 are opposite to each other, the second side 12 and the eighth side 24 are opposite to each other, and the third side 13 and the fifth side 21 are opposite to each other.

At the first edge line 10R, cutting edges are formed at the first side 11, the second side 12 and the third side 13, but no cutting edge is formed at the fourth side 14. Similarly, at the second edge line 20R, cutting edges are formed at the fifth side 21, the sixth side 22 and the seventh side 23, but no cutting edge is formed at the eighth side 24.

Specifically, a main cutting edge 11P of an outer peripheral edge 2P is formed at the first side 11; a wiper cutting edge 12P of the outer peripheral edge 2P and a main cutting edge 12C of a center edge 2C are adjacently formed at the second side 12; an inner edge 13C of the center edge 2C is formed at the third side 13. Like the first edge line 10R, a main cutting edge of the outer peripheral edge 2P is formed at the fifth side 21; a wiper cutting edge of the outer peripheral edge 2P and a main cutting edge of the center edge 2C are formed adjacently at the sixth side 22; an inner edge of the center edge 2C is formed at the seventh side 23.

The peripheral side surface 30 includes a first side surface 31, a second side surface 32, a third side surface 33 and a fourth side surface 34 partitioned by a first corner R1, a second corner R2, a third corner R3 and a fourth corner R4 respectively. The first side surface 31 is formed facing the first side 11 and the seventh side 23. The second side surface 32 is formed facing the second side 12 and the eighth side 24. The third side surface 33 is formed facing the third side 13 and the fifth side 21. The fourth side surface 34 is formed facing the fourth side 14 and the sixth side 22.

The fourth side surface 34 facing the fourth side 14 extends from the first end surface 10 to the second end surface 20 and is inclined in a direction from the second side 12 to the fourth side 14. Similarly, the second side surface 32 facing the eighth side 24 extends from the second end surface 20 to the first end surface 10 and is inclined in a direction from the sixth side 22 to the eighth side 24. The first side surface 31 and the third side surface 33 are formed into rough parallelograms where inner angles are not right angles.

Figure 5:
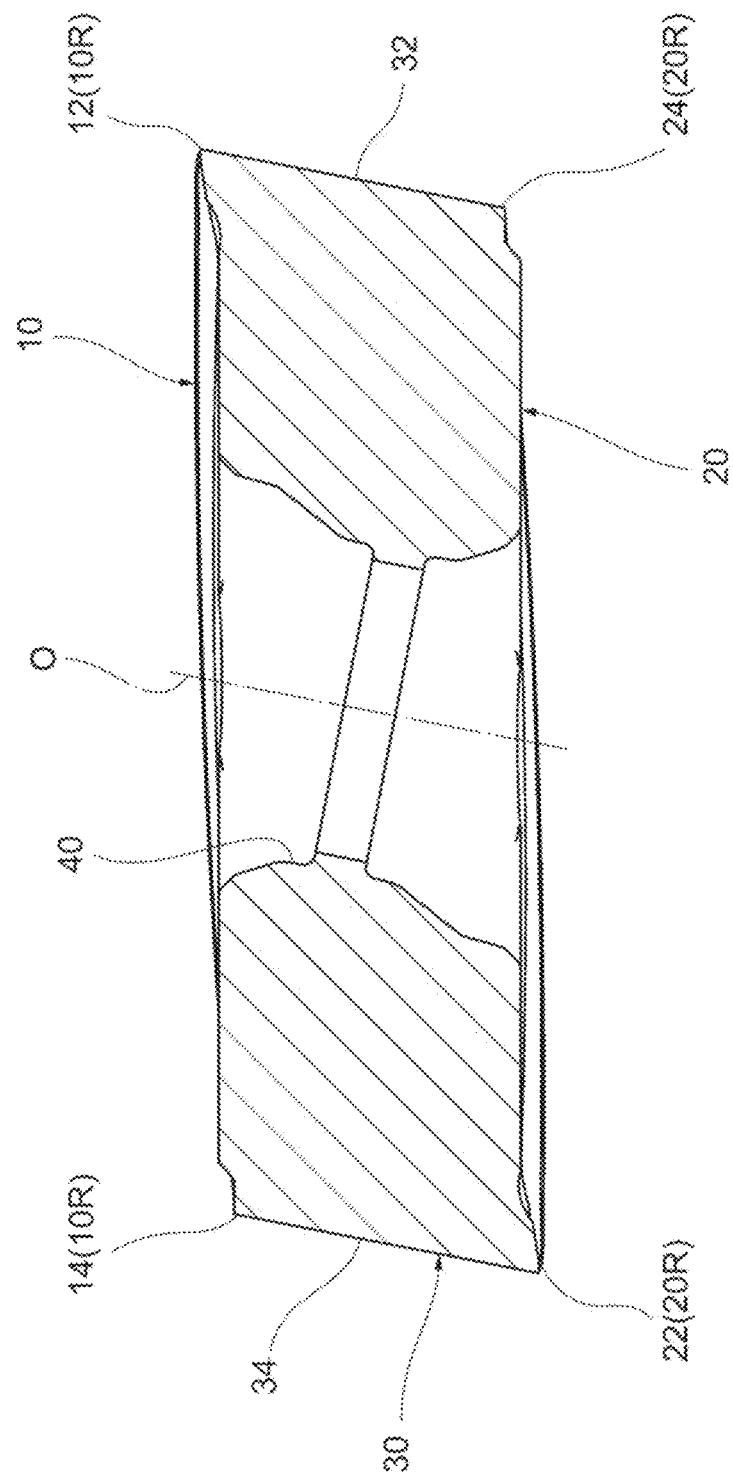
FIG. 5 is a cross-sectional view taken along line V-V in FIG. 4.

FIG. 4 is a front view illustrating the first end surface 10 of the cutting insert 2 shown in FIG. 3. As shown in FIG. 4, a mounting hole 40 is formed in the cutting insert 2, and the mounting hole 40 penetrates the center of the first end surface 10 and the center of the second end surface 20. FIG. 5 is a cross-sectional view taken along line V-V in FIG. 4. As shown in FIG. 5, a center axis O of the mounting hole 40 is not perpendicular to the first end surface 10 and the second end surface 20 but is inclined with respect to the first end surface 10 and the second end surface 20. In the example shown in the figure, the mounting hole 40 is formed in such a way that the second side surface 32 and the fourth side surface 34 are parallel to the center axis O.

Figure 6:
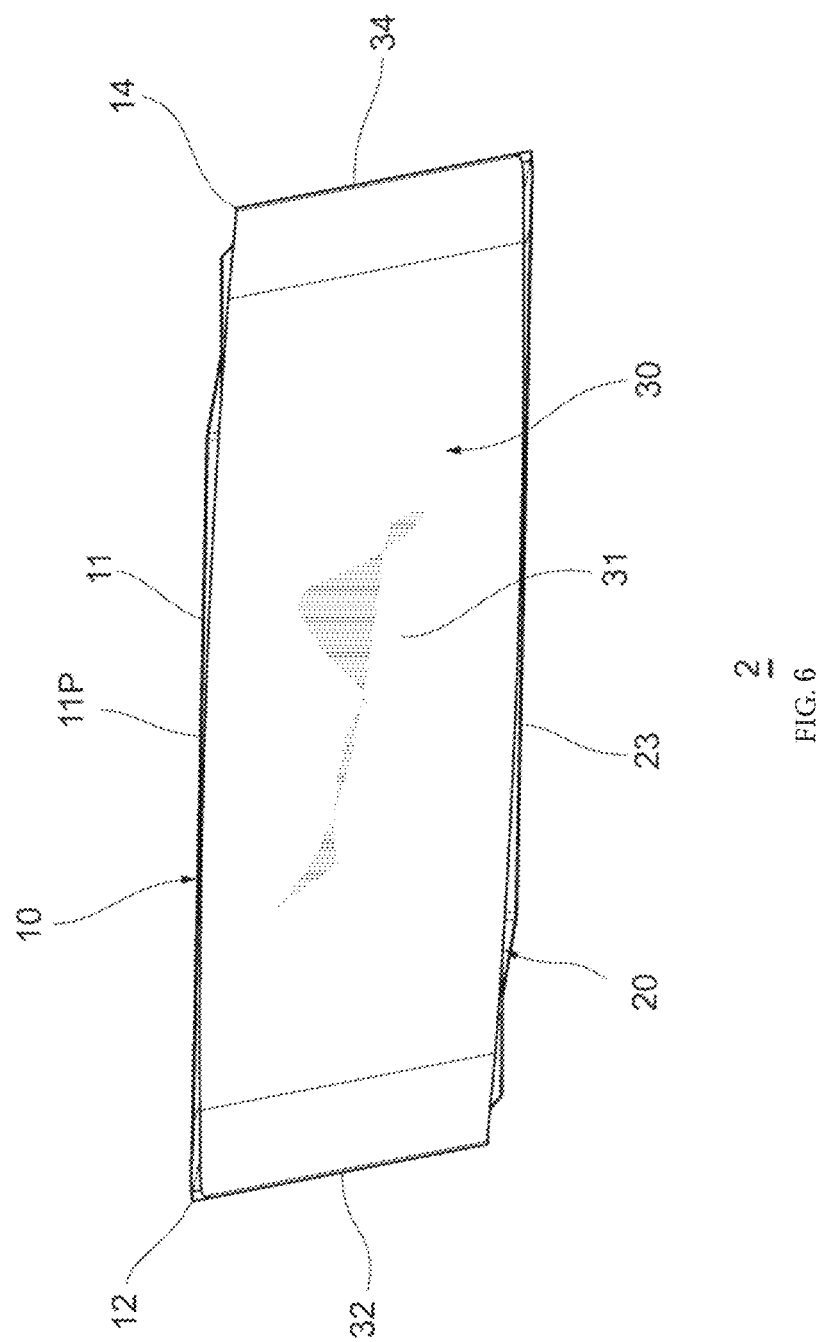
FIG. 6 is a side view illustrating a main cutting edge of the outer peripheral edge shown in FIG. 3.
Figure 7:
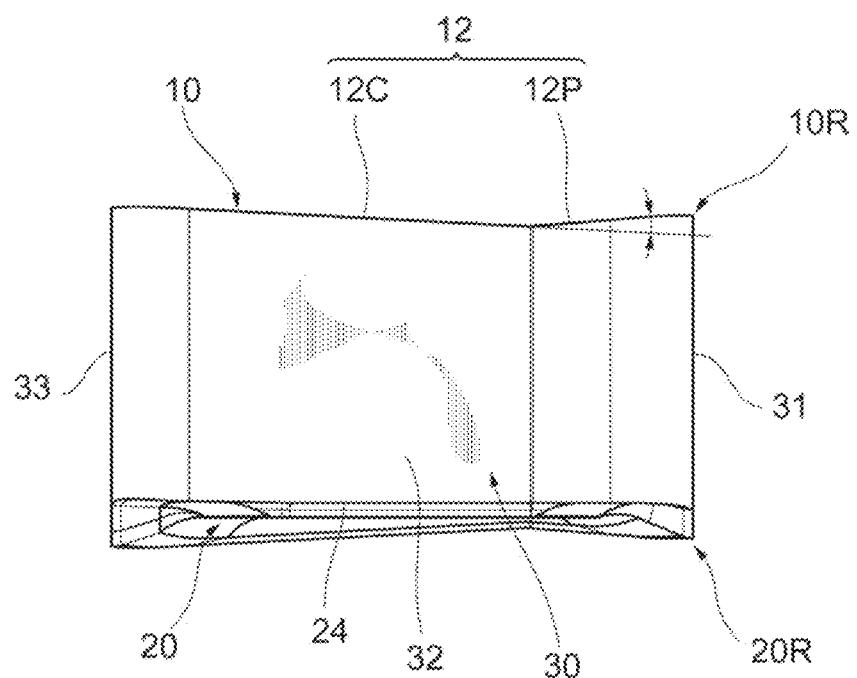
FIG. 7 is a side view illustrating a wiper cutting edge of the outer peripheral edge shown in FIG. 3.

FIG. 6 is a side view illustrating the main cutting edge 11P of the outer peripheral edge 2P shown in FIG. 3. As shown in FIG. 6, when viewed from the first side surface 31, the main cutting edge 11P of the outer peripheral edge 2P slightly bulges to an arc shape in a direction from the second end surface 20 to the first end surface 10. FIG. 7 is a side view illustrating the wiper cutting edge 12P of the outer peripheral edge 2P shown in FIG. 3. As shown in FIG. 7, the wiper cutting edge 12P of the outer peripheral edge 2P constituting the second side 12 and the main cutting edge 12C of the center edge 2C are not collinear. The wiper cutting edge 12P is slightly inclined with respect to the main cutting edge 12C. In the example shown in the figure, the wiper cutting edge 12P is inclined by 2° with respect to the main cutting edge 12C.

Figure 8:
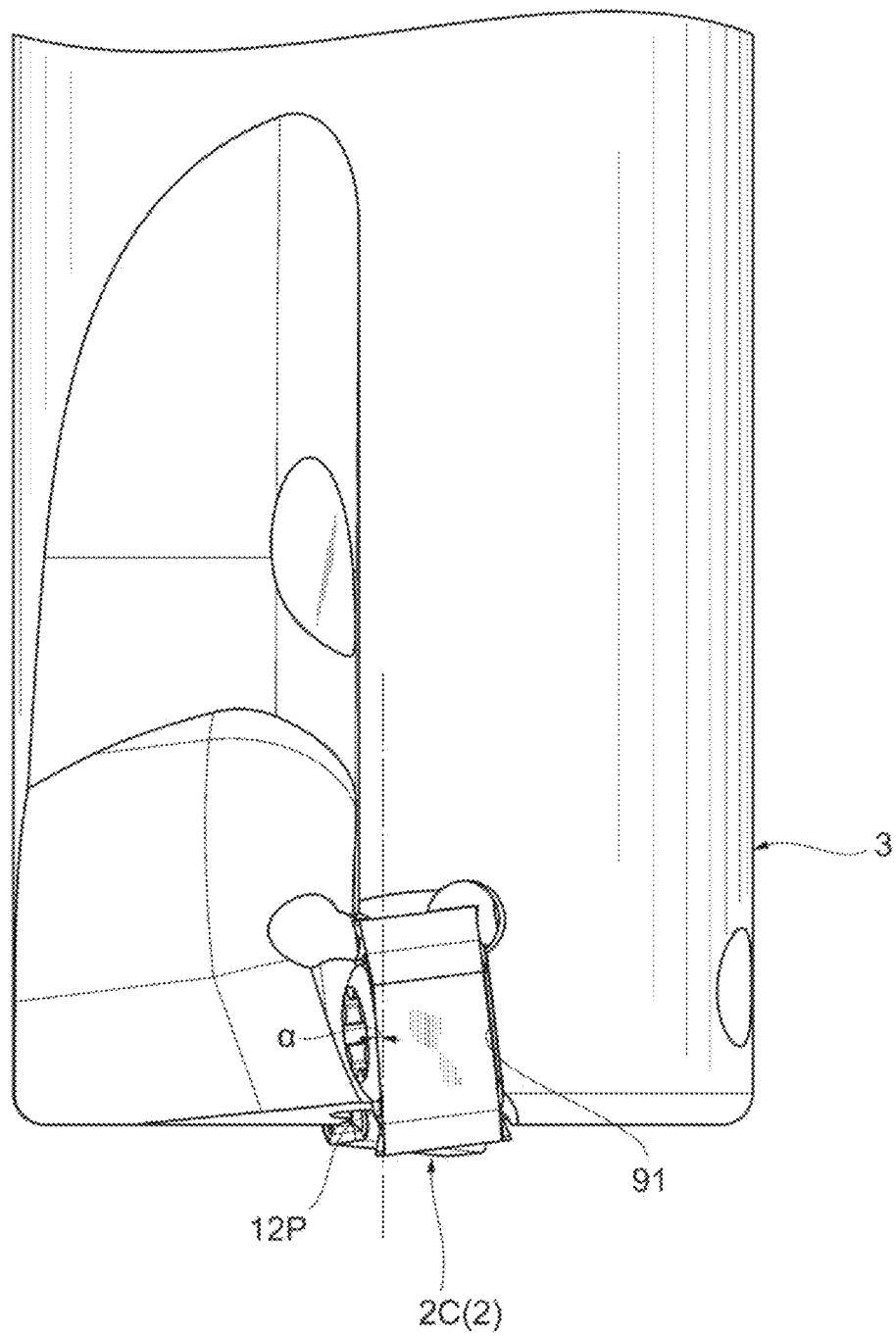
FIG. 8 is a diagram illustrating a rake angle of the main cutting edge of a center edge in a state of being attached to a tool body.

FIG. 8 is a diagram illustrating a rake angle $\alpha$ of the main cutting edge 11C of the center edge 2C in a state of being attached to the tool body 3. In the example shown in the figure, the fourth side 14 of the center edge 2C is attached in a direction along the rotation axis Z of the tool body 3. As shown in FIG. 8, the main cutting edge 11C of the center edge 2C is formed in a negative shape with a rake angle $\alpha$ of zero.

Figure 9:
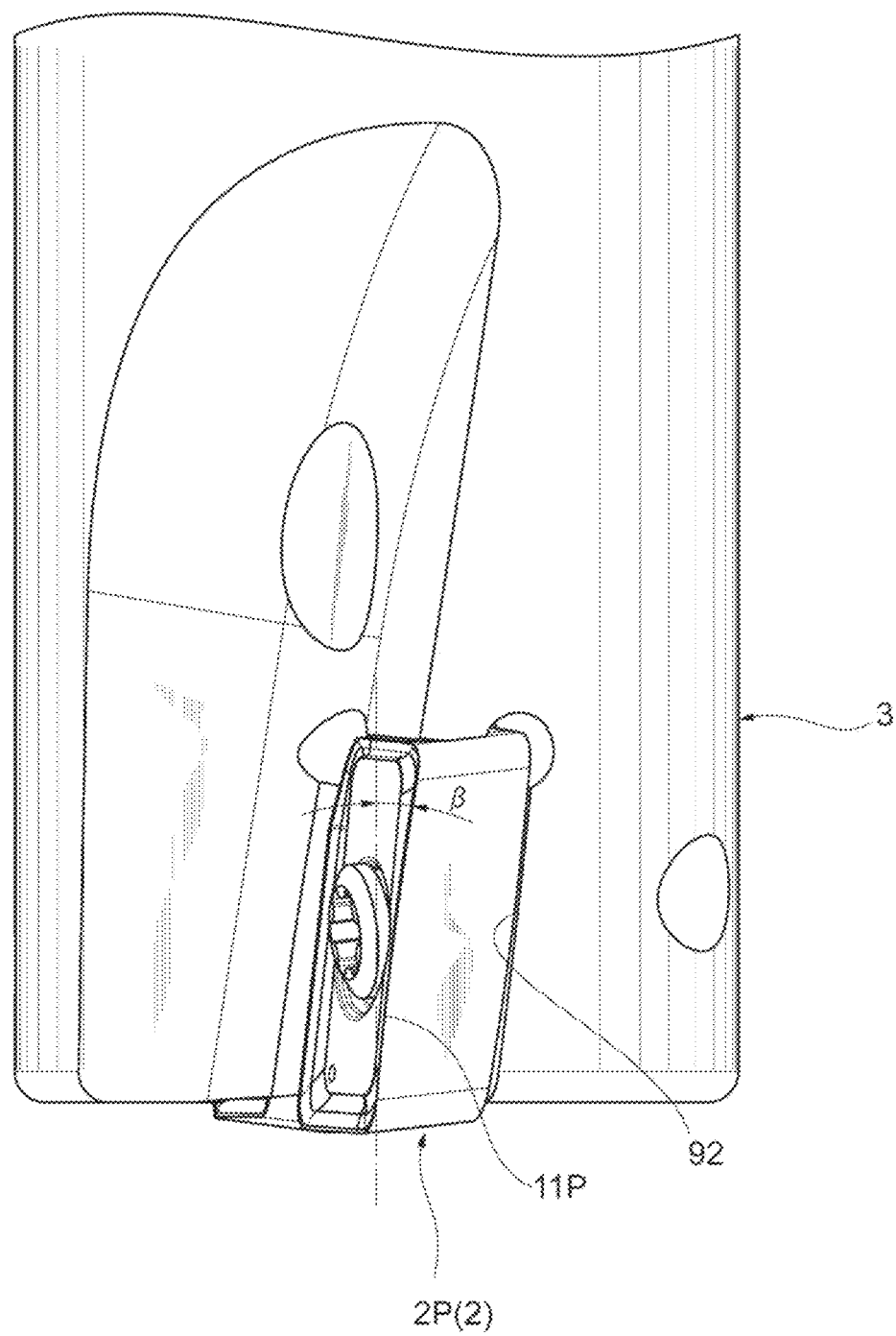
FIG. 9 is a diagram illustrating a rake angle of the main cutting edge of the outer peripheral edge in a state of being attached to the tool body.

FIG. 9 a diagram illustrating a rake angle $\beta$ of the main cutting edge 11P of the outer peripheral edge 2P in a state of being attached to the tool body 3. In the example shown in the figure, the third side 13 of the outer peripheral edge 2P is attached in a direction along the rotation axis Z. As shown in FIG. 9, the main cutting edge 11P of the outer peripheral edge 2P is formed in a positive shape with a positive rake angle $\beta$.

Figure 10:
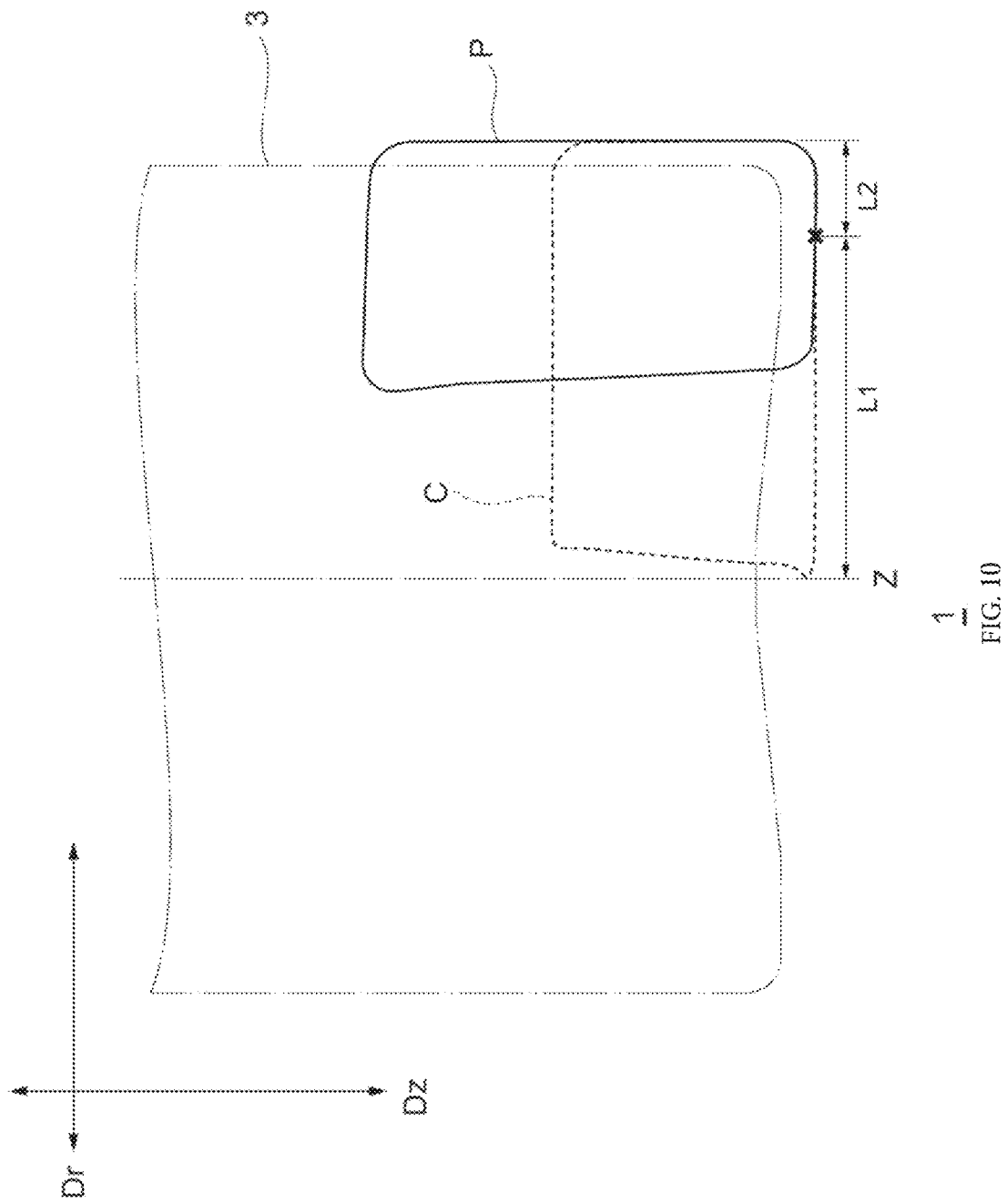
FIG. 10 is a diagram schematically showing rotation trajectories of the center edge and the outer peripheral edge in a state of being attached to the tool body.
Figure 11:
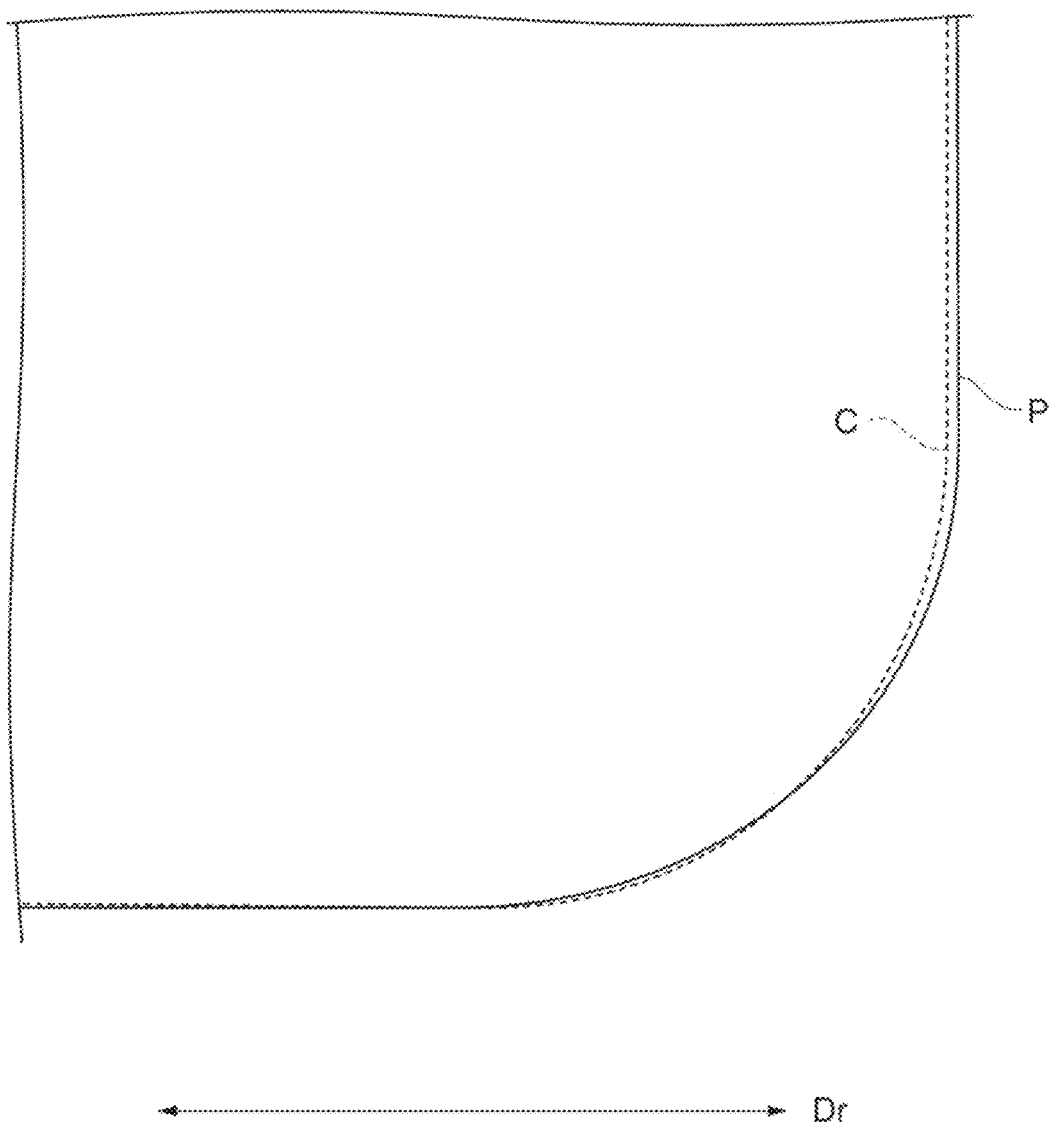
FIG. 11 is an enlarged view illustrating a lower right part in FIG. 10.

FIG. 10 is a diagram schematically showing rotation trajectories C, P of the center edge 2C and the outer peripheral edge 2P in a state of being attached to the tool body 3. FIG. 11 is an enlarged view illustrating a lower right part in FIG. 10. As shown in FIG. 11, on an outer peripheral side of the tool body 3, the rotation trajectory P of the main cutting edge 11P of the outer peripheral edge 2P protrudes more towards the outer side of a radial direction Dr of the tool body than the rotation trajectory C of the main cutting edge 12C of the center edge 2C.

In the example shown in the figure, in the radial direction Dr of the tool body 3, the outer peripheral edge 2P protrudes 0.02 mm more than the center edge 2C towards the outer side. As shown in FIG. 10, contours of the rotation trajectories C and P approach each other as they move toward the rotation axis Z of the tool body 3. In the example shown in the figure, the contours of the rotation trajectories C and P intersect at a position of L1:L2=8:2.

In the cutting insert 2 configured as described above and the end mill 1 provided with the cutting insert 2 in an implementation of the present disclosure, the cutting inserts 2 attached in a pair of two have the same shape such that the center edge 2C and the outer peripheral edge 2P are interchangeable. In addition, the first end surface 10 and the second end surface 20 of the cutting insert 2 have the same shape such that the front surface and the back surface are interchangeable. Thus, the cutting insert 2 may be used four times in total.

Short sides (the fourth and eighth sides 14 and 24), which are not formed into cutting edges, have a dovetail shape, and they are bite into the insert pockets 91 and 92 of the tool body 3 in a wedge shape and is firmly restrained. As shown in FIG. 5, the center axis O of the mounting hole 40 of the cutting insert 2 is not perpendicular to the rake surface but is inclined. When tightening with the fastening screw 9, since the cutting insert 2 may be pushed by pressing the fourth side 14 of the wedge-shaped cutting insert 2 into the corner of the insert pocket 91 or 92 of the tool body, the cutting insert 2 can be more stably fixed to the tool body 3.

As shown in FIG. 6, when viewed from the first side surface 31, the main cutting edge 11P of the outer peripheral edge 2P slightly bulges to an arc shape in a direction from the second end surface 20 to the first end surface 10. Compared with a main cutting edge 11P that is not bulged, the rotation trajectory P of the main cutting edge 11P in the present disclosure is closer to an ideal imaginary cylindrical surface; as a result, a smooth finished surface can be formed.

The outer peripheral edge 2P has a wiper cutting edge 12P for smoothing a finished surface of a material cut by the main cutting edge 11P. The center edge 2C does not have such a wiper cutting edge. However, as shown in FIGS. 10 and 11, since the rotation trajectory P of the outer peripheral edge 2P is slightly ahead of the rotation trajectory C of the center edge 2C, both the finished surface cut by the main cutting edge 11P of the outer peripheral edge 2P and the finished surface cut by the main cutting edge 12C of the center edge 2C can be smoothed by the wiper cutting edge 12P of the outer peripheral edge 2P.

As shown in FIG. 7, the wiper cutting edge 12P of the outer peripheral edge 2P is slightly inclined with respect to the main cutting edge 12C of the center edge 2C. When the main cutting edge 12C is used, the wiper cutting edge 12P is retracted from the main cutting edge in the advancing direction of the tool body 3. When the wiper cutting edge 12P is used, the main cutting edge 12C is retracted from the finished surface smoothed by the wiper cutting edge 12P. When the cutting insert 2 is used as the center edge 2C, the wiper cutting edge 12P of the outer peripheral edge 2P is not easily damaged. When the cutting insert 2 is used as the outer peripheral edge 2P, the main cutting edge 12C of the center edge 2C is not easily damaged.

The implementations described above are intended to facilitate the understanding of the present disclosure and are not for limiting and interpreting the present disclosure. The various elements and the arrangement, materials, conditions, shapes and dimensions thereof described in the implementations are not limited to the implementations, and may be appropriately changed. In addition, the structures shown in different implementations may be partially replaced or combined.

REFERENCE NUMERALS

1 . . . end mill, 2 . . . cutting insert, 2C . . . center edge, 2P . . . outer peripheral edge, 3 . . . tool body, 3P . . . outer peripheral surface, 9 . . . fastening screw, 10 . . . first end surface, 10R . . . first edge line, 11 . . . first side, 11P . . . main cutting edge of outer peripheral edge, 12 . . . second side, 12P . . . wiper cutting edge of outer peripheral edge, 12C . . . main cutting edge of center edge, 13 . . . third side, 13C . . . inner edge of center edge, 14 . . . fourth side, 20 . . . second end surface, 20R . . . second edge line, 21 . . . fifth side, 21P . . . main cutting edge of outer peripheral edge, 22 . . . sixth side, 22P . . . wiper cutting edge of outer peripheral edge, 22C . . . main cutting edge of center edge, 23 . . . seventh side, 23C . . . inner edge of center edge, 24 . . . eighth side, 30 . . . peripheral side surface, 31 . . . first side surface, 32 . . . second side surface, 33 . . . third side surface, 40 . . . mounting hole, 91 . . . insert pocket of center edge, 92 . . . insert pocket of outer peripheral edge, C . . . rotation trajectory of center edge, Dz . . . axial direction of tool body, Dθ . . . circumferential direction of tool body, 0 . . . center axis of mounting hole, P . . . rotation trajectory of outer peripheral edge, R1 . . . first corner, R2 . . . second corner, R3 . . . third corner, R4 . . . fourth corner, Z . . . rotation axis of tool body.

The invention claimed is:

1. A cutting insert having a first end surface, a second end surface opposite to the first end surface, and a peripheral side surface connecting the first end surface and the second end surface, wherein
a first edge line at which the first end surface intersects the peripheral side surface is a rectangle having a first side and a third side as long sides and a second side and a fourth side as short sides; a cutting edge is respectively formed only at the first side, the second side, and the third side of the first edge line; and no cutting edge is formed at the fourth side of the first edge line;
a second edge line at which the second end surface intersects the peripheral side surface is a rectangle having an identical shape to the first edge line; a sixth side where a cutting edge is formed is opposite to the fourth side, and an eighth side where a cutting edge is not formed is opposite to the second side;
the peripheral side surface comprises a fourth side surface facing the fourth side and the sixth side; and
the fourth side surface extends from the first end surface to the second end surface and is inclined in a direction from the second side to the fourth side.

2. The cutting insert according to claim 1, wherein a pair of two cutting inserts are attached to a tool body to form an end mill capable of drilling;
the two cutting inserts have an identical shape and are interchangeable;
one of the cutting inserts is a center edge in which the first side extends from an outer peripheral surface of the tool body to a rotation axis of the tool body in a state where the fourth side is attached in a direction along the rotation axis;
the other of the cutting inserts is an outer peripheral edge in which the second side is located on an outer peripheral surface opposite to the center edge in a state where the third side is attached in the direction along the rotation axis.

3. The cutting insert according to claim 2, wherein
in addition to a main cutting edge of the center edge, a wiper cutting edge for smoothing a finished surface of a material cut by the main cutting edge of the outer peripheral edge is also provided at the second side;
the wiper cutting edge of the outer peripheral edge is inclined with respect to the main cutting edge of the center edge.

4. The cutting insert according to claim 2, wherein
the cutting insert is provided with a mounting hole through which a fastening screw screwed into the tool body passes;
the mounting hole penetrates the first end surface and the second end surface, and a center axis of the mounting hole is inclined with respect to the first end surface and the second end surface.

5. The cutting insert according to claim 2, wherein
the peripheral side surface comprises a first side surface facing the first side;
when viewed from the first side surface, the main cutting edge of the outer peripheral edge bulges in a direction from the second end surface to the first end surface.

* * * * *